(12) United States Patent
Resende et al.

(10) Patent No.: US 9,229,990 B2
(45) Date of Patent: Jan. 5, 2016

(54) GENERATING METRICS FOR CONTENT ITEMS PRESENTED IN AN ONLINE SYSTEM

(71) Applicant: Facebook, Inc., Menlo Park, CA (US)

(72) Inventors: Danilo Torres de Sa Resende, San Francisco, CA (US); David Gross-Baser, Mountain View, CA (US); Janaka Liyanage, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 283 days.

(21) Appl. No.: 13/834,352

(22) Filed: Mar. 15, 2013

(65) Prior Publication Data
US 2014/0280105 A1   Sep. 18, 2014

(51) Int. Cl.
*G06F 17/30* (2006.01)
(52) U.S. Cl.
CPC ................................ *G06F 17/30551* (2013.01)
(58) Field of Classification Search
None
See application file for complete search history.

(56) References Cited

U.S. PATENT DOCUMENTS

| | | | |
|---|---|---|---|
| 8,812,960 B1* | 8/2014 | Sun et al. ....................... 715/757 |
| 2009/0158166 A1* | 6/2009 | Dewar et al. .................. 715/745 |
| 2011/0082719 A1* | 4/2011 | Dutta ............................. 705/7.29 |
| 2012/0259851 A1* | 10/2012 | Jia et al. ........................ 707/737 |
| 2013/0055137 A1* | 2/2013 | Choc et al. .................... 715/772 |
| 2013/0132863 A1* | 5/2013 | Lansford et al. .............. 715/753 |
| 2014/0245182 A1* | 8/2014 | Carbonell et al. ............ 715/753 |

* cited by examiner

*Primary Examiner* — Sherief Badawi
*Assistant Examiner* — Christopher J Raab
(74) *Attorney, Agent, or Firm* — Fenwick & West LLP (57) ABSTRACT

An online system allows creators and owners of content items presented within the system to view real-time metrics related to the content items. The online system stores data describing user interactions with content items in one or more activity logs and processes the activity logs in a distributed manner activity to identify user interactions with content items. For example, activity logs are divided into several portions that are processed in parallel using aggregation operators to generate user interaction aggregations. An aggregation includes one or more user interactions associated with the same content item and sharing certain criteria. From the user interaction aggregations, the online system determines one or more requested metrics, and may combine user interaction aggregations related to different content items when computing metrics.

17 Claims, 7 Drawing Sheets

| Ad ID 502 | Date 504 | Interaction Type 506 | List of Users 508 |
|---|---|---|---|
| | | | |
| | | | |
| | | | |
| | | | |
| | | | |
| | | | |

310

Row 508

Row 510

GENERATING METRICS FOR CONTENT ITEMS PRESENTED IN AN ONLINE SYSTEM

FIELD OF THE INVENTION

The present disclosure relates generally to content presentation in an online system, and more specifically to generating metrics for content items presented in an online system.

BACKGROUND

Social networking systems allow users to connect to and communicate with other users of the social networking system. Users create profiles on the social networking system that are tied to their identities and include information about the users, such as interests and demographic information. The users may be individuals or entities such as corporations or charities. Because of the increasing popularity of social networking systems and the significant amount of user-specific information maintained by social networking systems, a social networking system presents an ideal forum for advertising.

Many businesses dedicate significant resources to advertising products or services through advertising campaigns, which may present advertisements or information through social networking systems. A typical advertising campaign includes one or more advertising messages communicated to potential customers to meet an advertising objective. An example objective of an advertising campaign may be to increase awareness of the product being advertised; another example objective may be to generate a favorable opinion of a product to convince people to buy the product. Advertisers are often interested in measuring the effectiveness of their advertisements on the social networking systems in meeting their objectives.

In measuring effectiveness of an advertisement campaign, advertisers often look for advertisement metrics that are both accurate and real-time. However, conventional methods for determining advertisement metrics do not operate in real-time. More specifically, conventional advertisement platforms often present effectiveness metrics as pre-computed reports generated at regular time intervals. Such pre-computed reports do not capture the most recent data impacting the effectiveness metrics. Further, conventional advertisement platforms do not allow advertisers to define their own metrics or data analysis techniques, despite differences between advertisers in measuring advertisement effectiveness.

SUMMARY

An online system allows creators and owners of content items presented within the system to view real-time metrics related to the content items. The online system stores data describing user interactions with content items, such as advertisements, presented to its users over time. For example, the online system maintains an activity log having various entries identifying a content item, a type of interaction, temporal information associated with the interaction, and users performing the type of interaction. To efficiently determine metrics related to a content item, the online system processes the activity log or activity logs including user interactions with content items in a distributed manner. For example, activity logs are divided into several portions that are processed in parallel using aggregation operators to generate user interaction aggregations. The aggregation operators specify criteria used to group user interactions into an aggregation. Hence, an aggregation includes one or more user interactions associated with a content item and sharing certain criteria. From the aggregations, the online system generates one or more metrics describing interactions with a content item during a specified time interval.

To provide more accurate metrics, the online system may retrieve previously aggregated data describing interactions with a content item and also identify stored interactions with the content item that have not been aggregated. For example, the online system generates partitions of stored interactions to identify interactions with the content items from various partitions in parallel. The identified interactions with the content item may be aggregated based on an aggregation operator to produce an intermediate aggregation that describes stored interactions with the content item that are not previously aggregated and stored. Using the stored aggregations of interactions with the content items and the intermediate aggregation, the online system determines the metric to provide the most current value for the metric.

Hence, advertisers that run advertisement campaigns on the online system may view real-time metrics related to the campaigns or groups of campaigns by requesting such metrics from the online system. A request for a metric describing a campaign or a group of campaigns specifies the content items within the campaign, or campaigns, and a type of metric. Examples of the requested metric include a number of users that accessed a content item identified by the request, a number of conversions of a content item identified by the request, and a number of interactions with the content item identified by the request. The online system processes the metrics request using real-time aggregations as well as previously-computed aggregations to generate a value for the metric being requested.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Environment

Figure 1:
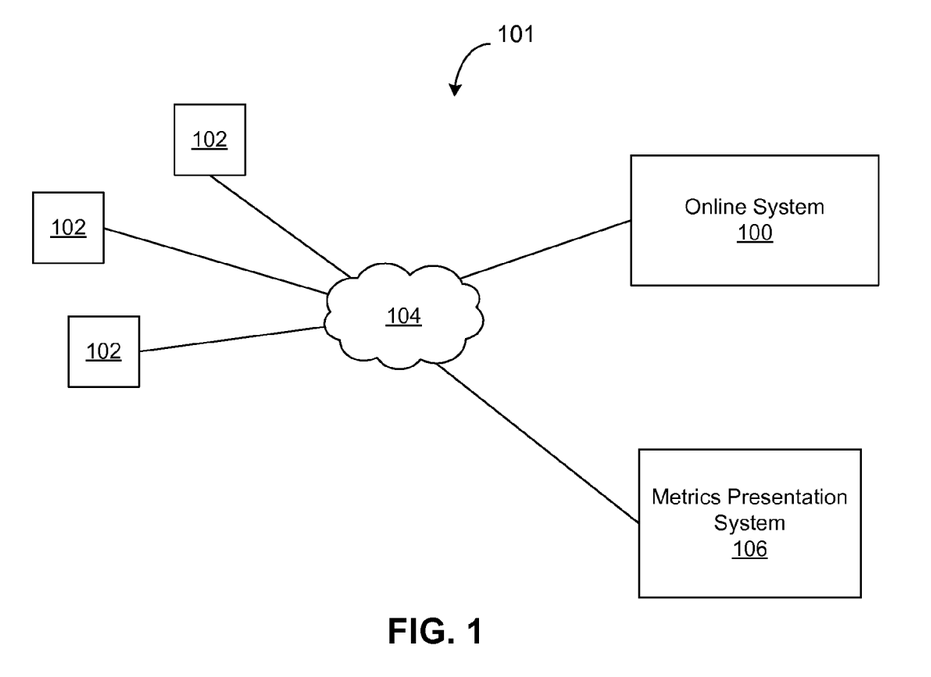
FIG. 1 is a high level block diagram of a computing environment suitable for operation of an online system, in accordance with an embodiment of the invention.

FIG. 1 is a high level block diagram of one embodiment of a computing environment 101 suitable for operation of an online system 100. The computing environment 101 shown in FIG. 1 includes the online system 100, multiple client devices 102, a metrics presentation system 106 connected via a network 104. In other embodiments, the computing environment 101 may include different and/or additional components than those shown in FIG. 1.

Users interact with the online system 100 using client devices 102. In various embodiments, a client device 102 may be a personal computer (PC), a desktop computer, a laptop computer, a notebook, a tablet computer, or other similar device. In other embodiments, a client device 102 may be any device having computer functionality, such as a personal digital assistant (PDA), mobile telephone, smartphone, or other device.

A user interacts with the online system 100 via an application, such as a web browser or a native application, executing on the client device 102. Example interactions with the online system 100 include operations such as browsing content, posting and sending messages, retrieving and sorting messages received from other users, and the like. For example, the application loads a messaging interface provided by the online system 100 to send and receive messages. The messages may be sent or received through different messaging channels and/or formats. A messaging channel is any technology suitable for delivering electronic messages to a user. Examples of a messaging channel include web-chat (e.g., a chat application of a web-page hosted by the messaging system 100), e-mail, extensible messaging and presence protocol (XMPP), short message service (SMS) texting, and mobile chat (e.g., via an application installed on a mobile client 102). Messages may include plain text and may include other content such as pictures, videos, and attachments.

In one embodiment, the online system 100 maintains information describing its users and presents content to its users. Examples of information maintained by the online system 100 include information describing other users, social groups, social events, advertisements, images, and so on. For example, the online system 100 is a social networking system that presents different type of content to the users. An example of the online system 100 is further described below in conjunction with FIG. 2.

The metrics presentation system 106 allows entities associated with content presented by the online system 100 to analyze different metrics related to the content. For example, the metrics presentation system 106 allows users that provided content to the online system 100 to analyze metrics describing presentation of the provided content to online system users. In operation, the metrics presentation system 106 provides an interface for users to request metrics describing individual content or groups of content from the online system 100. Metrics provided by the metrics presentation system 106 may include the number of people that have viewed or accessed a particular content item, the number of interactions with a particular content item, or any other suitable information. The metrics presentation system 106 retrieves the requested metric information from the online system 100 and presents the metric information to the user. In one embodiment, the metrics presentation system 106 is a third-party system independent from the online system 100. Alternatively, the metrics presentation system 106 is a component of the online system 100.

The network 104 enables communications between the client devices 102, the online system 100 and the metrics presentation system 106. In one embodiment, the network 104 uses standard communications technologies and/or protocols. Thus, the network 104 may include communication channels using technologies such as Ethernet, 802.11, worldwide interoperability for microwave access (WiMAX), 3G, 4G, digital subscriber line (DSL), code division multiple access (CDMA), or other suitable technologies. Examples of networking protocols used by the network 104 include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and other suitable protocols. Data exchanged over the network 104 may be represented using any suitable technology or format, such as hypertext markup language (HTML) or extensible markup language (XML). In addition, all or some of the communication channels may be encrypted using conventional encryption technologies such as secure sockets layer (SSL), transport layer security (TLS), virtual private networks (VPNs), Internet Protocol security (IPsec), etc. In some embodiments, the entities may use custom and/or dedicated data communications technologies instead of, or in addition to, the ones described above. Depending upon the embodiment, the network 104 may also include links to other networks, such as the Internet.

System Architecture

Figure 2:
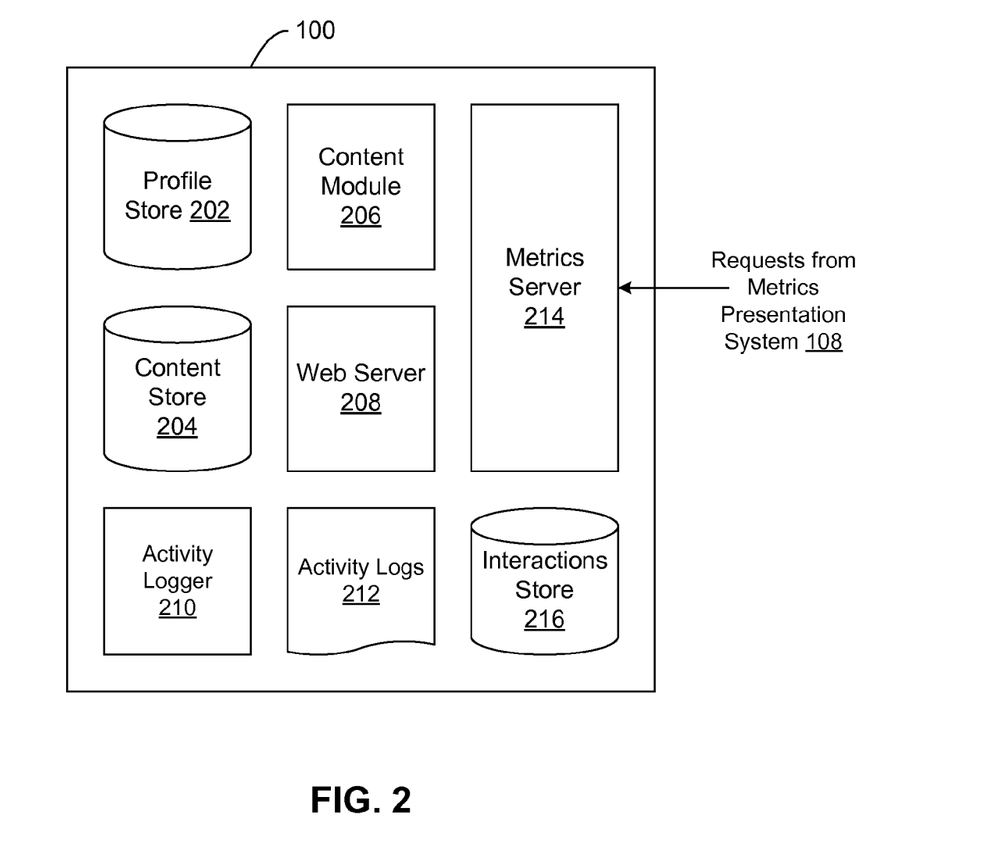
FIG. 2 is a block diagram of various components of the online system, in accordance with an embodiment of the invention.

FIG. 2 is a block diagram of one embodiment of the online system 100. In the example shown by FIG. 2, the online system 100 includes a profile store 202, a content store 204, a content module 206, a web server 208, an activity logger 210, one or more activity logs 212, a metrics server 214, and an interactions store 216. In other embodiments, the online system 100 may include additional, fewer, or different modules for various applications. Conventional components such as network interfaces, security mechanisms, load balancers, failover servers, management and network operations consoles, and the like are not shown so as to not obscure the details of the system.

Each user of the online system 100 is associated with a user profile, which is associated with a user profile stored in the profile store 202. User account information, such as a unique user identification (ID), a login name and password, and other related information for a user are stored in the profile store 202 and associated with a corresponding user profile. In one embodiment, the user account information is indexed by the user ID or by any other suitable information.

A user profile in the user profile store 202 includes declarative information about the user that was explicitly shared by the user and may also include profile information inferred by the online system 100. In one embodiment, a user profile includes multiple data fields, each data field describing one or more attributes of the corresponding user of the online system 100. Examples of attributes described by information in a user profile include biographic, demographic, and other types of descriptive information, such as work experience, educational history, gender, hobbies or preferences, location and the like. A user profile may also include other information provided by the user, for example, images or videos. In certain embodiments, images of users may be tagged with identification information of users of the online system 100 displayed in an image. A user profile in the profile store 202 may also maintain references to actions by the corresponding user performed on content items from the content store 204 and stored in an action log 226.

While user profiles in the profile store 202 are frequently associated with individuals, allowing people to interact with each other via the online system 100, user profiles may also be stored for entities such as businesses or organizations. This allows an entity to establish a presence on the online system 100 for connecting and exchanging content with other online system users. The entity may post information about itself, about its products, or provide other information to users of the online system using a brand page associated with the entity's user profile. Other users of the online system 100 may connect to the brand page to receive information posted to the brand page or to receive information from the brand page. A user profile associated with the brand page may include information about the entity itself, providing users with background or informational data about the entity.

The content store 204 stores objects representing various types of content. Examples of content represented by an object include a page post, a status update, a photo, a video, a link, a shared content item, a gaming application achievement, a check-in at a location, a brand page, an advertisement, or any other type of content. Objects may be created by users of the online system 100, such as status updates, photos tagged by users to be associated with other objects in the online system, events, groups, or applications. In some embodiments, objects are received from third-party applications or third-party applications separate from the online system 100. Content "items" are single pieces of content that are represented as objects in the online system 100. Users of the online system 100 are encouraged to communicate with each other by posting text and content items of various types of media through various communication channels, increasing the interaction of users with each other and increasing the frequency with which users interact within the online system 100.

The content module 206 selects content items from the content store 204 for presentation to various users of the online system 100. In various embodiments, the content module 206 uses information maintained by the online system 100 for a user, such as a user profile, to select content for presentation to the user. For example, the content module 206 identifies other users associated with a user based on the user's user profile and selects content items associated with the identified other users for presentation to the user.

At least some of the content items selected by the content module 206 for presentation to users include advertisements. An advertisement is associated with a bid specifying an amount of compensation received by the online system 100 from an advertiser for presenting an advertisement or for a user interacting with a presented advertisement. Additionally, an advertisement may also be associated with targeting criteria identifying characteristics of users eligible to be presented with the advertisement. In one embodiment, the content module 206 selects advertisements for presentation to a user based on the bids associated with advertisements. For example, the content module 206 determines the expected value of advertisements to the online system 100 based on the bids associated with various advertisements and/or the likelihood of a user interacting with various advertisements. In one embodiment, the content module 206 uses an auction to select one or more advertisements based on their expected values to the online system 100.

The activity logger 210 receives communications about user interactions with content items and advertisements internal to and/or external to the online system 100 and populates an activity log 212 with information about the user interactions. Examples of interactions, or "actions," include adding a connection to another user, sending a message to another user, uploading an image, reading a message from another user, viewing content associated with another user, attending an event posted by another user, among others. In some embodiments, the activity logger 210 identifies interactions between an online system user and a brand page within the online system 100 and communicates targeting criteria associated with content on the brand page to the content module 206 to customize content from the brand page. In addition, a number of actions described in connection with other objects are directed at particular users, so these actions are associated with those users as well. These actions are stored in the activity logs 212.

The activity logs 212 may be used by the online system 100 to track user interactions on the online system 100. Users may interact with various content items presented by the online system 100, including commenting on posts, sharing links, checking-in to physical locations, accessing content items, or other interactions. Information describing these actions is stored in the activity logs 212. Additional examples of interactions with objects on the online system 100 included in the activity logs 212 include commenting on a photo album, communicating content to another user, joining an event, joining a group, becoming a fan of a brand page, creating an event, authorizing an application, using an application, and engaging in a transaction. Additionally, the activity logs 212 records a user's interactions with content on the online system 100 as well as other applications operating on the online system 100. In some embodiments, data from the activity logs 212 is used to infer interests or preferences of the user, augmenting the interests included in the user's user profile and allowing a more complete understanding of user preferences. In one embodiment, an entry in the activity logs 212 comprises a user identifier, a content item identifier (e.g., a post identifier, an advertisement identifier, a recommendation unit identifier, etc.) and a timestamp. For example, an entry in the activity logs 212 has the format:

{user_id, content_id, timestamp}

In one embodiment, log entries in the activity logs 212 are indexed by the user identifier and the conversion identifier to expedite retrieval of data from the activity logs 212.

In some embodiments, the activity logs 212 also store user actions taken on external websites. For example, an e-commerce website that primarily sells sporting equipment at bargain prices may recognize a user of an online system 100 through social plug-ins allowing the e-commerce website to identify the online system user. Because users of the online system 100 are uniquely identifiable, e-commerce websites, such as this sporting equipment retailer, may use the information about these users as they visit their websites. The activity logs 212 record data about these users, including webpage viewing histories, interactions with presented items, purchases made, and other patterns from shopping and buying.

The web server 208 links the online system 100 via the network 104 to one or more client devices 102, as well as to one or more external websites, such as a third-party website, and or to the metrics presentation system 106. The web server 208 serves web pages, as well as other content, such as JAVA®, FLASH®, XML and so forth. The web server 208 may also receive and route messages between the online system 100 and the client devices 102, for example, instant messages, queued messages (e.g., email), text and short message service (SMS) messages, or messages sent using any other suitable messaging technique. A user may send a request to the web server 212 to upload information, such as images or videos, for storing in the content store 204. Additionally, the web server 212 may provide application programming interface (API) functionality to send data directly to native client device operating systems, such as IOS®, ANDROID™, WEBOS®, or RIM®.

Figure 3A:
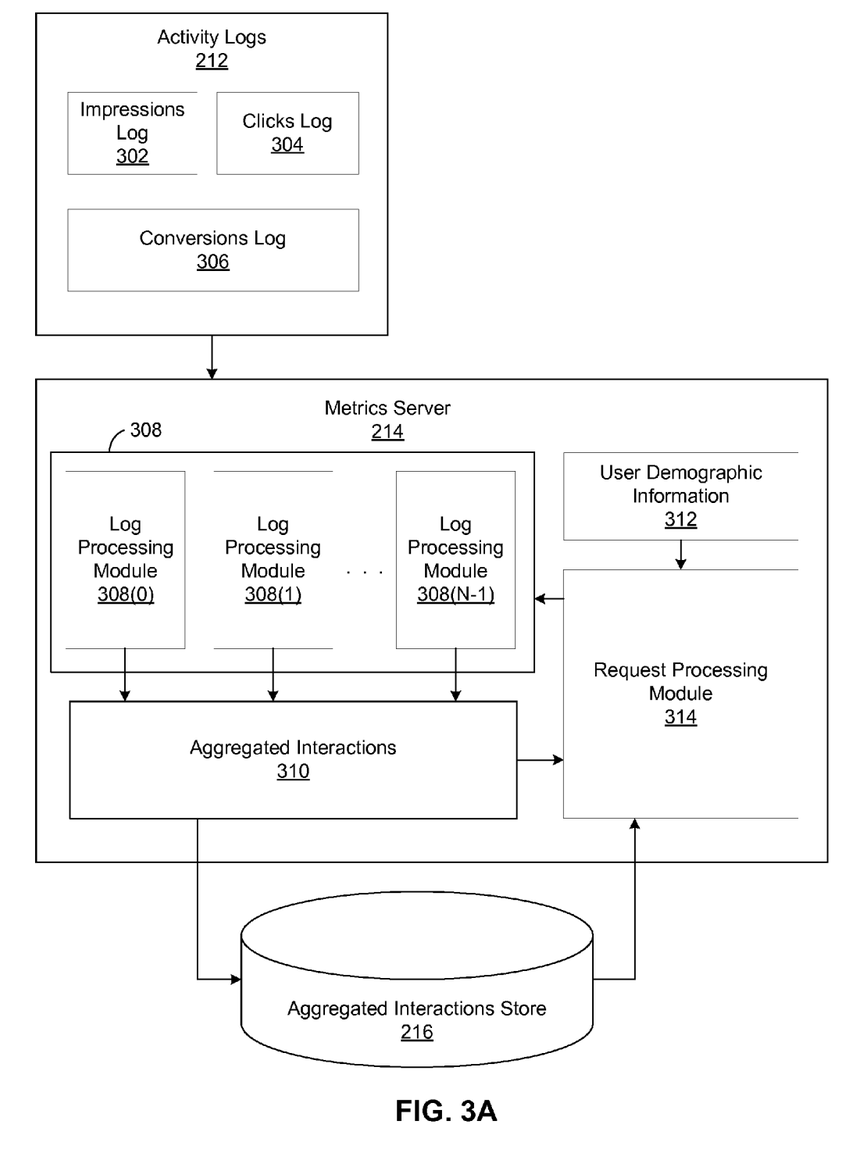
FIG. 3A is a detailed block diagram of the metrics server of FIG. 2, in accordance with an embodiment of the invention.

The metrics server 214 analyzes the activity logs 212 to aggregate user interactions related to a content item. The metrics server 214 analyzes the activity logs 212 in real-time so that user interactions are aggregated soon after being captured by the activity logs 212. Aggregated user interactions with a content item are stored in the interactions store 216. Additionally, the metrics server 214 receives requests for metrics associated with content items or advertisements from the metrics presentation system 106 and analyzes aggregated user interactions from the interactions store 216 associated with the content item specified by the request. In some embodiments, the metrics server 214 also retrieves interactions with the specified content item from the activity logs 212 that are not yet stored in the interactions store 216. Based on the retrieved aggregated data associated with the specified content item, the metrics server 214 computes one or more metrics for the specified content item. The metrics may be specified by the request or may be determined based on preferences stored by the metrics server 214. Aggregation and metric computation is described in greater detail below in conjunction with FIGS. 3 and 4.

Metrics Server Operation

FIG. 3A is a detailed block diagram of one embodiment of the metrics server 214. As shown in the example of FIG. 3A, the activity logs 212 include an impressions log 302, a clicks log 304 and a conversions log 306. The metrics server 214 includes various log processing modules 308(0), 308(1), 308 (N−1) (also referred to individually and collectively using reference number 308), aggregated interactions 310, user demographic information 312 and a request processing module 314.

In one embodiment, the activity logs 212 include logs detailing individual user interactions with various content items, including advertisements. The impressions log 302 captures each unique presentation of a content item to a user as a content item impression. For example, if an advertisement was presented once to one user and twice to another user, then three content item impressions are associated with the advertisement. The impressions log 302 stores each of impression as a separate entry. The clicks log 304 captures each unique access, or "click," of a content item presented to a user as a separate entry. For example, if a user accesses an advertisement by interacting with the advertisement, then an entry representing the access is added to the clicks log 305.

The conversions log 306 stores each conversion of a content item as a separate entry. Various types of user interactions with content items distributed via an online system 100 may be a "conversion" of presentation of a content item. Examples of user interactions that may be classified as a conversion include: viewing a photo, playing a video, following a link, sharing a content item, expressing a preference for a content item ("liking" the content item), commenting on a content item, becoming a fan of a content item, sponsoring a post, registering for a service, joining an event, participating in a poll, voting online, claiming an offer for a product or service, and any other suitable actions supported by the online system 100. Accordingly, a user associated with content items presented by the online system 100 (e.g., a user associated with a brand page presenting content items), may identify one or more types of interactions with a content item as a conversion, allowing the user to track the identified interactions with content items presented by the online system 100.

A log processing module 308 analyzes the activity logs 212 in a distributed fashion to aggregate user interactions captured by the activity logs 212. In the embodiment shown by FIG. 3A, a particular log processing module 308, such as the log processing module 308(0), analyzes log entries in one or more of the activity logs 212 to identify unique interactions with content items. The log processing module 308(0) groups the identified interactions according to an aggregation operator. As an example, the log processing module 308(0) groups together interactions from the activity logs 212 that are associated with the same content item and occurred on the same day. In one embodiment, different log processing modules 308(0), 308(1), 308(N−1) process a different one of the impressions log 302, the clicks log 304, and the conversions log 306. In an alternate embodiment, multiple logs from the activity logs 212 are combined and processed together by a single log processing module 308.

Figure 3B:
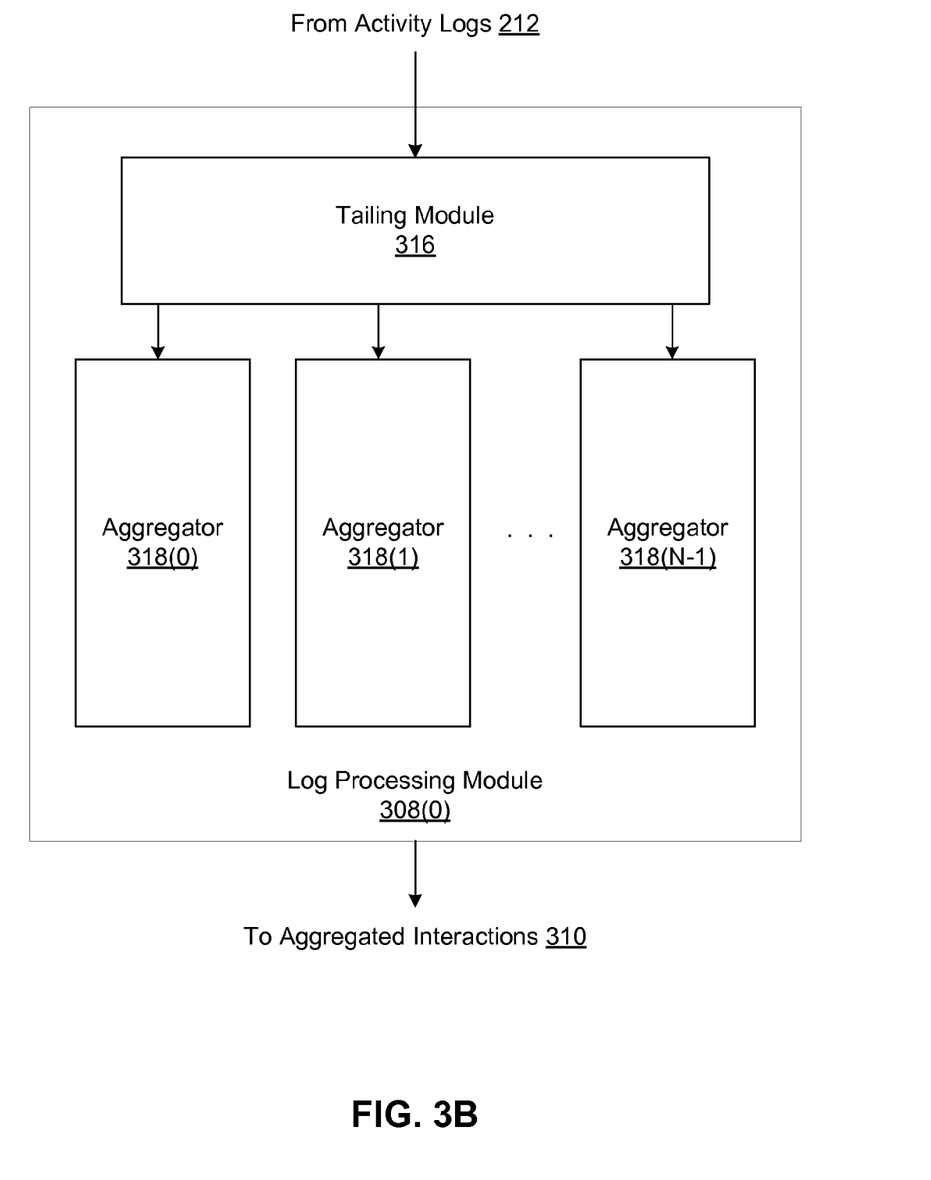
FIG. 3B is a detailed block diagram of the log processing module of FIG. 3A, in accordance with an embodiment of the invention.

FIG. 3B shows detailed block diagram of one embodiment of the log processing module 308(0). As shown, the log processing module 308(0) includes a tailing module 316 and one or more aggregators 318(0), 318(1), 318(N−1) (also referred to individually and collectively using reference number 318). However, in other embodiments, the log processing module 308(0) may include different and/or additional components. Although a single log processing module 308(0) is discussed in conjunction with FIG. 3B, each log processing module 308 provides the functionality further described below.

The log processing module 308(0) processes at least one log from the activity logs 212 (referred to as the "log(s) being processed"). In one embodiment, the tailing module 316 divides the log(s) being processed into a number of smaller log portions for more efficient processing. For each log portion, the tailing module 316 parses the log portion to identify log entries in the log portion that have not yet been analyzed. As discussed above, each entry in a log included in the activity logs 212 corresponds to a unique user interaction with a particular content item. Consequently, the tailing module 316 extracts user interactions that have not been aggregated from the log(s) being processed ("new entries"). The tailing module 316 transmits the new entries to the aggregators 318 for aggregation.

Each of the aggregators 318 processes log entries included in a different log portion using one or more aggregation operator. An aggregation operator specifies how to group various log entries. For example, an aggregation operator specifies that all log entries associated with the same content item are grouped together. A different aggregation operator may specify that all log entries associated with the same content item and user interactions occurring on the same day are grouped together.

Further, aggregation operators may be associated with specific content items so that log entries associated with one set of content items are grouped according to one aggregation operator while log entries associated with a different set of content items are grouped according to a different aggregation operator. As used herein, the term "set" refers to a grouping of one or more items. In one embodiment, the aggregation operators are user-defined and may be updated by the metrics server 214 based on user input. By applying aggregation operators to log entries received from the tailing module 316, each aggregator 318 generates intermediate aggregated data. The intermediate aggregated data generated by various aggregators 318 is combined and stored as aggregated data 310.

Referring back to FIG. 3A, the aggregated data 310 stores groups of interactions generated by the different log processing modules 308. For example, the aggregated data 310 is stored in local random access memory. In one embodiment, a group of interactions generated by one log processing module 308 is combined with the groups of interactions generated by other log processing modules 308 that are associated with the same content item(s). The metrics server 214 periodically transmits the groups of interactions stored in the aggregated data 310 to the aggregated interactions store 216 for persistent storage.

The request processing module 314 processes requests for metrics related to user interactions associated with one or more content items using the aggregated data 310, the aggregated interactions store 216 and, optionally, the user demographic information 312. The user demographic information 312 stores demographic information related to users of the online system 100. For example, the user demographic information includes demographic information about online system users in local random access memory. In operation, the request processing module 314 receives a metric request from the metrics presentation system 106. A metric request identifies one or more content items and, optionally, a time period for which the metric is requested.

Upon receiving a metric request, the request processing module 314 transmits a request to the log processing modules 308 to aggregate user interactions captured by the activity logs 212 and associated with the content item(s) identified in the metric request. Based on the request from the request processing module 314, the log processing modules 308 generate the aggregated interactions 310 associated with the identified content items(s). The request processing module 314 combines the aggregated interactions with aggregated data retrieved from the aggregated interactions store 216 that is associated with the content item(s) identified in the metric request. Using the combined aggregated data, the request processing module 314 determines a value for the metric.

In one embodiment, the online system 100 includes at least one shadow server (not shown) that mirrors the operation of the metrics server 214. A shadow server processes the activity logs 212, accesses the aggregated interactions store 216 and serves metric requests in the same manner as the metrics server 214. In such an embodiment, the load of serving metric requests is divided between the metrics server 214 and the one or more shadow servers.

Figure 4:
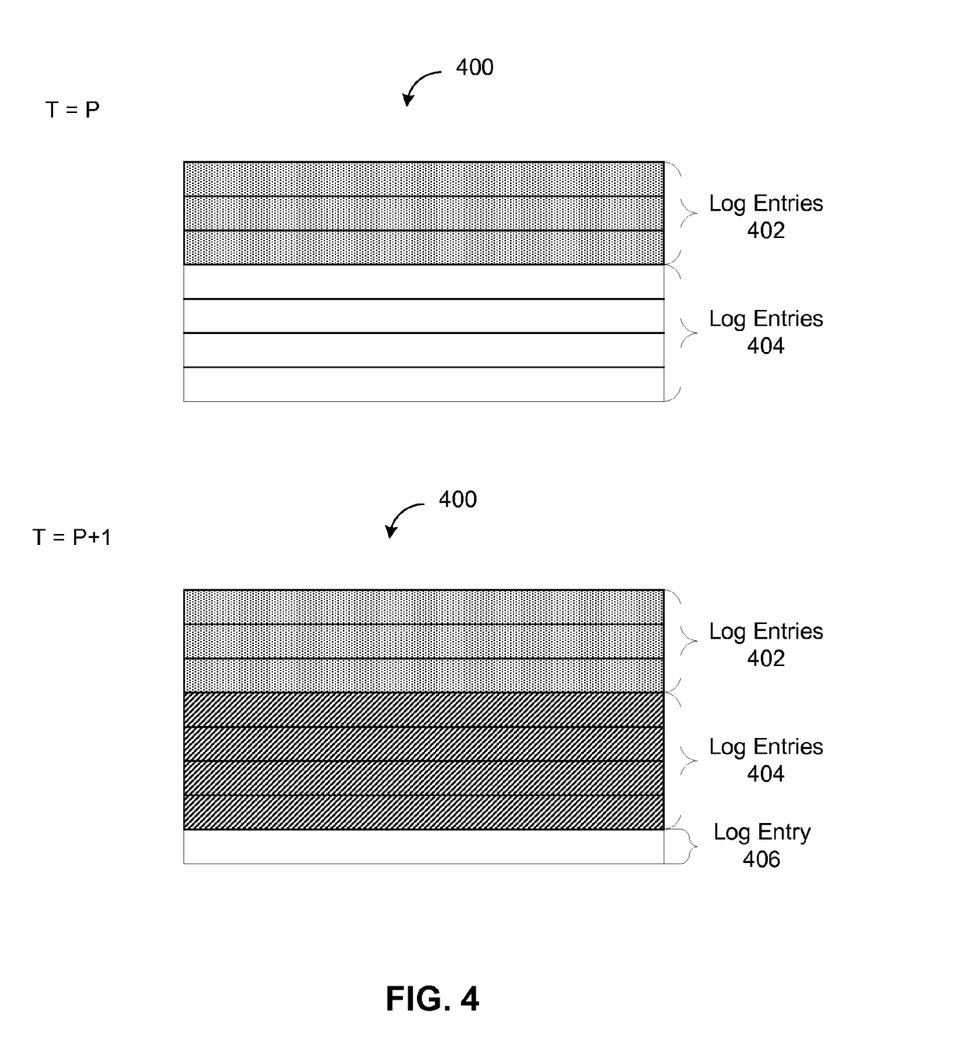
FIG. 4 illustrates log entries stored in a log portion at different times, in accordance with an embodiment of the invention.

FIG. 4 illustrates an example of log entries stored in a log portion 400 at different times. For purposes of illustration, assume the request processing module 314 receives a request for a metric associated with content item A at time P (T=P). At time P, the log portion 400 includes log entries 402 and log entries 404. In FIG. 4, the log entries 402 have previously been processed and the resulting aggregations stored in the aggregated interactions store 216. However, in FIG. 4, the log entries 404 have not been processed by the log processing module 308. Hence, when the request for the metric is received, the request processing module 314 transmits a request to the log processing modules 308 to aggregate log entries included in the activity logs 212 that have not been previously processed.

At time P+1 (T=P+1), the log processing modules 308 have aggregated the log entries 404 that were not processed at time T=P and stored the resulting aggregations in the aggregated interactions 310. The request processing module 314 analyzes the aggregated interactions 310 and the aggregations stored in the aggregated interactions store 216 to identify aggregations associated with content item A and computes a value for the metric requested based on the identified aggregations. Assume that during the processing of log entries 404, the log portion 400 captures a new log entry 406. In one embodiment, the request processing module 314 also processes the log portion 400, including the new log entry 406, as well as the aggregated interactions 310 to compute the value for the metric, allowing the metric to account for more recent interactions. In an alternate embodiment, the aggregated interactions 310 used by the request processing module 314 to compute the value for the metric account for the user interaction associated with the new log entry 408 even though the new log entry 408 was captured by the log portion 400 after the request for the metric was received.

Figure 5:
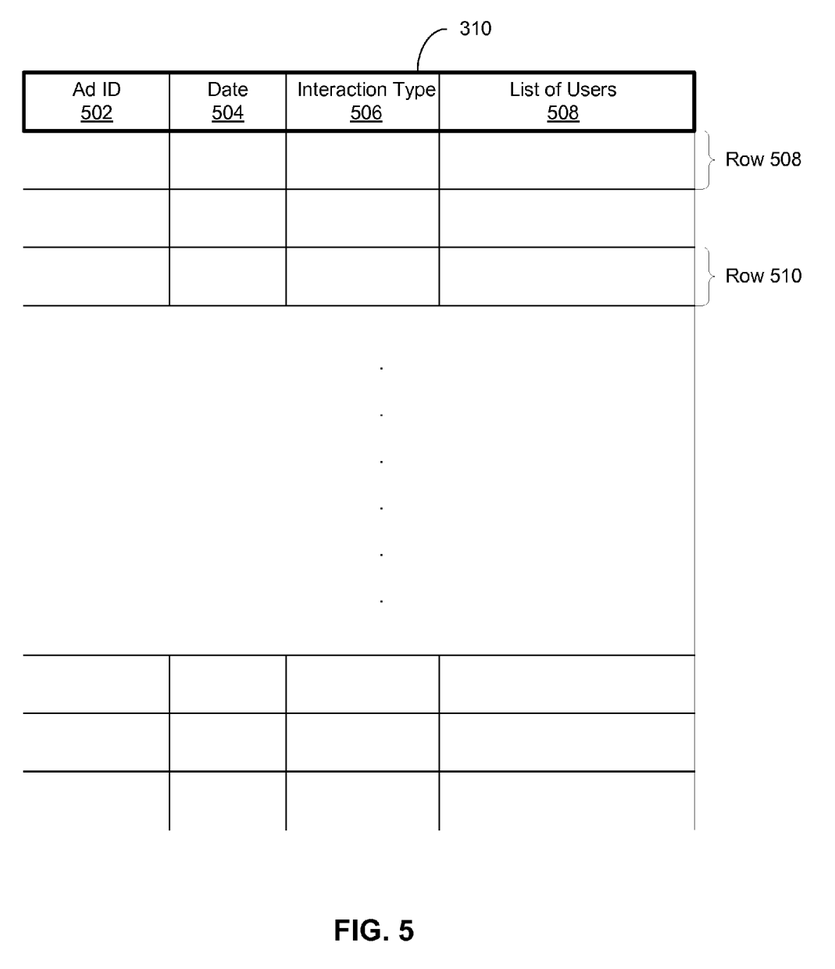
FIG. 5 illustrates an example structure for storing aggregations of user interactions with advertisements, in accordance with an embodiment of the invention.

FIG. 5 shows an example structure of the stored aggregated interactions 310 with content items. In the example of FIG. 5, the aggregated interactions 310 are stored as a table having an advertisement identifier column 502, a date column 504, an interaction type column 506, and a list of users column 508. While FIG. 5 shows an advertisement identifier column 502, a content identifier column may be included in some embodiments. In one embodiment, aggregated interactions are stored in the aggregated interactions store 216 using a similar structure.

Each row in the table represents a different aggregation of user interactions aggregation. Specifically, in FIG. 5, each row of the aggregated interactions 310 represents the list of users that interacted with the advertisement specified in column 502 in a particular manner on the date specified in column 504. A unique row in the grid, such as row 508 and row 510, is associated with a different combination of values for the advertisement identifier column 502, the date column 504 and the interaction type column 506. For example, row 508 may have advertisement identifier A in column 502, date B in column 504, interaction type "view" in column 506, and a list of users X, Y and Z in column 508. Row 510 may have advertisement identifier A in column 502, date C in column 504, interaction type "click" in column 506 and a list of users V, W and Z in column 508. Alternatively, row 510 may have advertisement identifier C in column 502, date B in column 504, interaction type "click" in column 506, and a list of users X and Y in column 506.

For discussion purposes, assume that the request processing module 314 receives a metric request from the metrics presentation system 106 for a metric related to multiple groups of advertising campaigns. Each group of advertising campaigns includes one or more advertisement campaigns, each campaign including one or more advertisements about a particular product or service. The metric request includes advertisement identifiers associated with the one or more advertisements in each advertisement campaign and/or advertisement identifiers associated with the different advertisement campaigns or groups of advertisement campaigns. The metric request also includes the type of interaction for which the metric is to be computed and, optionally, the time period for which the metric is to be computed. The type of interaction may be an impression, a click, a conversion, or any other suitable value.

The request processing module 314 analyzes the rows in aggregated interactions 310 to identify rows including an advertisement identifier in column 502 corresponding to an advertisement identifier in the metric request. From the identified rows, the request processing module 314 selects rows having an interaction type in column 506 matching the interaction type specified in the request and having a date in column 504 within the time period specified by the request (if any). The request processing module 314 then computes an intermediate value for the metric based on the list of users specified in the selected rows.

The request processing module 314 also analyzes the aggregated interactions store 216 to identify any data associated with an advertisement identifier corresponding to the one or more advertisement identifiers specified in the metric request. From the identified data, the request processing module 314 selects data having an interaction type matching the interaction type specified in the metric request and having a date within the time period specified by the metric request (if any). The request processing module 314 then computes an additional intermediate value for the metric based on the selected data from the aggregated interactions store 216. The request processing module 314 combines the intermediate value and the additional intermediate value to generate the value of the metric and transmits the value to the metrics presentation system 106. In such a manner, metrics related to a particular interaction with a particular content item, such as an advertisement, are computed across multiple groups of advertisement campaigns based on the aggregated data.

Figure 6:
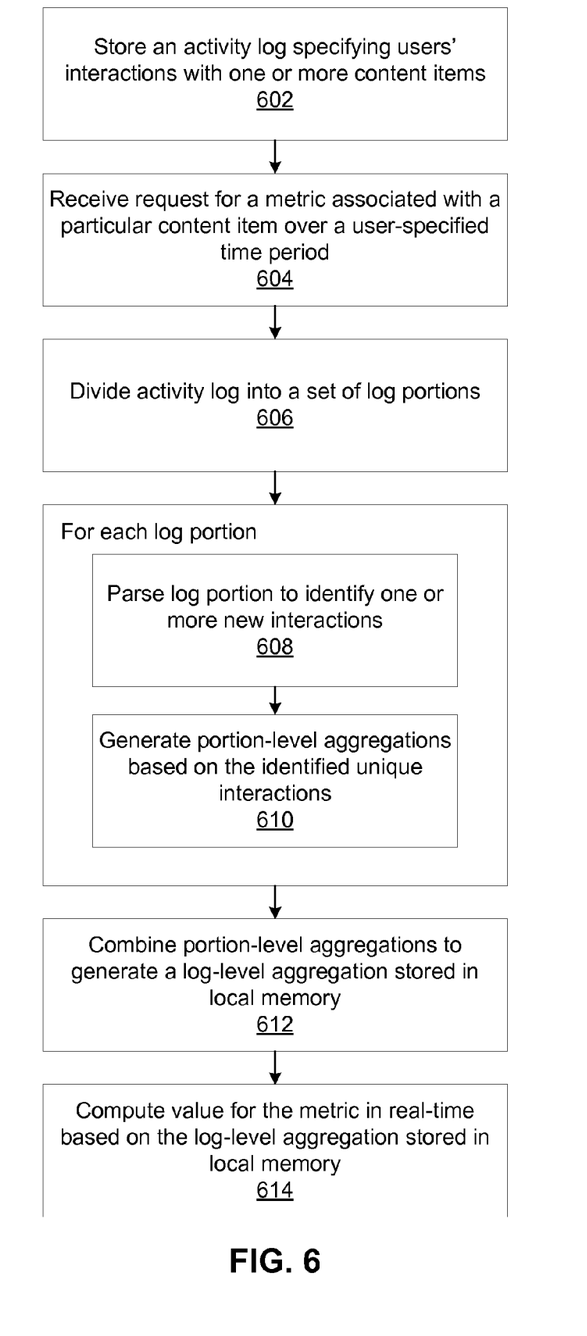
FIG. 6 is a flowchart of a method for computing a metric value associated with user interactions of content items, in accordance with an embodiment of the invention.

FIG. 6 is a flowchart of one embodiment of a method for computing a metric value associated with user interactions of content items. The activity logs 212 store 602 data describing user interactions of a particular type with content items. An activity log 212 includes a set of entries, each entry corresponding to a unique user interaction with a particular content item. The request processing module 314 receives 604 a metric request for metrics related to user interactions associated with one or more content items. Upon receiving 604 the metric request, the request processing module 314 transmits a request to the log processing modules 308 to aggregate user interactions captured by the activity logs 212 and related to the content item(s) identified in the metric request.

A log processing module 308 processing the activity logs 212 divides 606 one or more of the activity logs 212 into a set of smaller log portions for more efficient processing. For each log portion, the log processing module 308 parses 608 the log portion to identify log entries in the log portion not previously processed. One or more aggregators 318 in the log processing module 308 generate 610 portion-level intermediate aggregations from the parsed log portions by applying one or more aggregation operators to the log entries identified by the log processing module 308. In one embodiment, the aggregation operators are user-defined functions specifying criteria for grouping user interactions captured by an activity log 212. The intermediate aggregations generated by each aggregator 318 are combined 612 and stored as aggregated data 310. Based on the stored aggregated data 310, the request processing module 314 computes 614 a value for the metric. The metric value may then be presented to a user or stored for subsequent retrieval.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:

storing, in an online system, data describing interactions between one or more users of the online system and one or more content items presented by the online system;

generating aggregations of types of interactions between one or more users and each of the one or more content items, wherein an aggregation of a type of interaction identifies one or more users performing the type of interaction on a content item;

receiving a request for a metric describing interactions with one or more content items identified by the request and presented by the online system during a time interval;

dividing stored interactions between one or more users of the online system and one or more of the content items identified by the request into a plurality of portions, the stored interactions not included in any of the aggregations;

generating one or more intermediate aggregations of user interactions from the plurality of portions by applying an aggregation operator to user interactions included in the plurality of portions; and combining the one or more intermediate aggregations into a combined aggregation;

retrieving one or more aggregations of types of interactions identifying one or more content items identified by the request;

generating a value for the metric based on the combined aggregation and the retrieved one or more aggregations; and storing the value for the metric.

2. The method of claim 1, wherein storing, in the online system, data describing interactions between one or more users of the online system and one or more content items presented by the online system comprises:

storing an activity log including a plurality of entries, each entry identifying a content item, an interaction with the content item, a time associated with the interaction, and a user identifier.

3. The method of claim 1, wherein generating one or more intermediate aggregations of user interactions comprises:

applying the aggregation operator to each portion using a different processing engine of a distributed processing system.

4. The method of claim 1, wherein the aggregation operator is a user-defined function specifying groupings of user interactions.

5. The method of claim 1, wherein generating the value for the metric based on the identified stored interactions and the retrieved one or more aggregations comprises:

retrieving user demographic information associated with users performing the stored interactions and the interactions in the retrieved one or more aggregations; and generating the value for the metric based at least in part on the retrieved user demographic information.

6. The method of claim 1, wherein a content item identified by the request comprises an advertisement belonging to an advertisement campaign.

7. The method of claim 6, wherein an additional content item identified by the request comprises an additional advertisement belonging to an additional advertisement campaign.

8. The method of claim 1, wherein the metric is selected from a group consisting of: a number of users that viewed a content item identified by the request, a number of users that accessed the content item identified by the request, a number of conversions of the content item identified by the request, a number of interactions with the content item identified by the request, and any combination thereof.

9. A method comprising:

storing, in an online system, data describing interactions between one or more users of the online system and one or more content items presented by the online system;

receiving a request from a user for a metric describing interactions with one or more content items identified by the request and presented by the online system;

generating a plurality of partitions of the stored data each describing interactions between one or more users of the online system and the one or more content items presented by the online system;

dividing stored interactions between one or more users of the online system and one or more of the content items identified by the request into a plurality of portions, the stored interactions not included in any of the aggregations;

generating one or more intermediate aggregations of user interactions from the plurality of portions by applying an aggregation operator to user interactions included in the plurality of portions; and combining the one or more intermediate aggregations into a combined aggregation;

retrieving one or more aggregations of types of interactions identifying one or more content items identified by the request;

generating a value for the metric based on the combined aggregation and the retrieved one or more aggregations; and storing the value for the metric.

10. The method of claim 9, wherein generating the intermediate aggregation from each of the plurality of partitions comprises:

applying the aggregation operator to each portion using a different processing engine of a distributed processing system.

11. The method of claim 9, wherein the aggregation operator is a user-defined function specifying groupings of user interactions.

12. The method of claim 9, wherein generating the value for the metric based at least in part on the aggregation comprises:

retrieving user demographic information associated with users performing the stored interactions; and generating the value for the metric based at least in part on the retrieved user demographic information.

13. The method of claim 9, wherein generating the value for the metric based at least in part on the aggregation comprises:

retrieving stored aggregations including user interactions with one or more of the content items identified by the request; and generating the value for the metric based on the retrieved stored aggregations and on the aggregation; and retrieving user demographic information associated with users performing the stored interactions.

14. The method of claim 9, wherein a content item identified by the request comprises an advertisement belonging to an advertisement campaign.

15. The method of claim 14, wherein an additional content item identified by the request comprises an additional advertisement belonging to an additional advertisement campaign.

16. The method of claim 9, wherein the metric is selected from a group consisting of: a number of users that viewed a content item identified by the request, a number of users that accessed the content item identified by the request, a number of conversions of the content item identified by the request, a number of interactions with the content item identified by the request, and any combination thereof.

17. A method comprising:

storing, in an online system, data describing interactions between one or more users of the online system and one or more advertisements presented by the online system, wherein the one or more advertisements are included in a plurality of groups of advertisement campaigns;

receiving a request from a user for a metric describing interactions with groups of advertisement campaigns identified by the request and presented by the online system;

generating a plurality of partitions of the stored data each describing interactions between one or more users of the online system and the one or more advertisements presented by the online system;

dividing stored interactions between one or more users of the online system and one or more of the content items identified by the request into a plurality of portions, the stored interactions not included in any of the aggregations;

generating one or more intermediate aggregations of user interactions from the plurality of portions by applying an aggregation operator to user interactions included in the plurality of portions; and combining the one or more intermediate aggregations into a combined aggregation;
retrieving one or more aggregations of types of interactions identifying one or more content items identified by the request;
generating a value for the metric based on the combined aggregation and the retrieved one or more aggregations; and
storing the value for the metric.

* * * * *